(12) United States Patent
Weber et al.

(10) Patent No.: US 10,775,948 B2
(45) Date of Patent: *Sep. 15, 2020

(54) TOUCH CONTROL GLAZING WITH A CAPACITIVE TOUCH SENSITIVE DEVICE AND A LIGHT EMITTING DIODE AND THE MANUFACTURING

(71) Applicant: SAINT-GOBAIN GLASS FRANCE, Courbevoie (FR)

(72) Inventors: Patrick Weber, Alsdorf (DE); Stefan Droste, Herzogenrath (DE); Pascal Bauerle, Roye (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/311,947

(22) PCT Filed: Jun. 29, 2017

(86) PCT No.: PCT/IB2017/000906
§ 371 (c)(1),
(2) Date: Dec. 20, 2018

(87) PCT Pub. No.: WO2018/002707
PCT Pub. Date: Jan. 4, 2018

(65) Prior Publication Data
US 2019/0179459 A1    Jun. 13, 2019

(30) Foreign Application Priority Data
Jun. 29, 2016 (EP) .................................. 16305795

(51) Int. Cl.
*G06F 3/044* (2006.01)
*B32B 17/10* (2006.01)
*G06F 3/041* (2006.01)

(52) U.S. Cl.
CPC .......... *G06F 3/044* (2013.01); *B32B 17/1022* (2013.01); *B32B 17/10036* (2013.01);
(Continued)

(58) Field of Classification Search
CPC ................... G02F 3/041; G02F 3/0412; G02F 3/044–0448; G02F 2203/04111;
(Continued)

(56) References Cited

U.S. PATENT DOCUMENTS 6,452,514 B1    9/2002  Philipp
9,740,343 B2 *  8/2017  Hotelling ............. G06K 9/0002
(Continued)

FOREIGN PATENT DOCUMENTS

CN    101687392 A    3/2010
CN    104080753 A    10/2014
(Continued)

OTHER PUBLICATIONS

International Search Report as issued in International Patent Application No. PCT/IB2017/000906, dated Nov. 28, 2017.
(Continued)

*Primary Examiner* — Sanjiv D. Patel
(74) *Attorney, Agent, or Firm* — Pillsbury Winthrop Shaw Pittman LLP

(57) ABSTRACT

A touch control glazing includes a first transparent glazing; an electrically conductive layer and a capacitive touch sensitive device including a touch sensitive structure formed in the electrically conductive layer, the touch sensitive structure including a ground electrode and a touch electrode having a touch sensitive area; and a light emitting diode arranged on the electrically conductive layer to indicate the touch sensitive area, the light emitting diode having a light emitting surface facing at least partially the touch sensitive area, the light emitting diode having a first terminal being an (Continued)

first electrode zone electrically connected to the ground electrode and a second terminal being a second electrode zone electrically connected to the touch sensitive area.

23 Claims, 5 Drawing Sheets

(52) U.S. Cl.
CPC .. *B32B 17/10211* (2013.01); *B32B 17/10229* (2013.01); *B32B 17/10467* (2013.01); *B32B 17/10541* (2013.01); *G06F 3/041* (2013.01)

(58) Field of Classification Search
CPC . G02F 2203/04112; G02F 2203/04107; G02F 1/1334; G02F 1/13439; G02F 1/137; G02F 1/1525; G02F 1/157; B32B 17/10036; B32B 17/10541; G02B 6/0095
See application file for complete search history.

(56) References Cited

U.S. PATENT DOCUMENTS

| | | | | |
|---|---|---|---|---|
| 2009/0219468 A1* | 9/2009 | Barton | ................... | B32B 17/10 349/104 |
| 2010/0179725 A1* | 7/2010 | Boote | ................... | B32B 17/10 701/36 |
| 2014/0169037 A1* | 6/2014 | Berard | ............. | B32B 17/10036 362/612 |
| 2014/0377580 A1 | 12/2014 | Manz | | |
| 2015/0165965 A1* | 6/2015 | Masaki | ............. | B32B 17/10532 362/513 |
| 2016/0179244 A1* | 6/2016 | Keller | ..................... | G06F 3/044 345/174 |
| 2017/0041987 A1* | 2/2017 | Weber | ...................... | H05B 3/84 |
| 2019/0179458 A1* | 6/2019 | Weber | ............... | B32B 17/10788 |

FOREIGN PATENT DOCUMENTS

| | | |
|---|---|---|
| CN | 104379344 A | 2/2015 |
| DE | 20 2006 006 192 U1 | 7/2006 |
| DE | 20 2008 017 611 U1 | 4/2010 |
| EP | 0 899 882 A1 | 3/1999 |
| EP | 0 847 965 B1 | 10/2004 |
| EP | 1 515 211 A1 | 3/2005 |
| WO | WO 2008/113978 A1 | 9/2008 |
| WO | WO 2012/052315 A1 | 4/2012 |
| WO | WO 2013/189796 A1 | 12/2013 |
| WO | WO 2015/086599 A1 | 6/2015 |
| WO | WO 2015/086683 A1 | 6/2015 |
| WO | WO 2015/162107 A1 | 10/2015 |

OTHER PUBLICATIONS

Office Action as issued in Chinese Patent Application No. 201780001653.3, dated May 26, 2020.

* cited by examiner

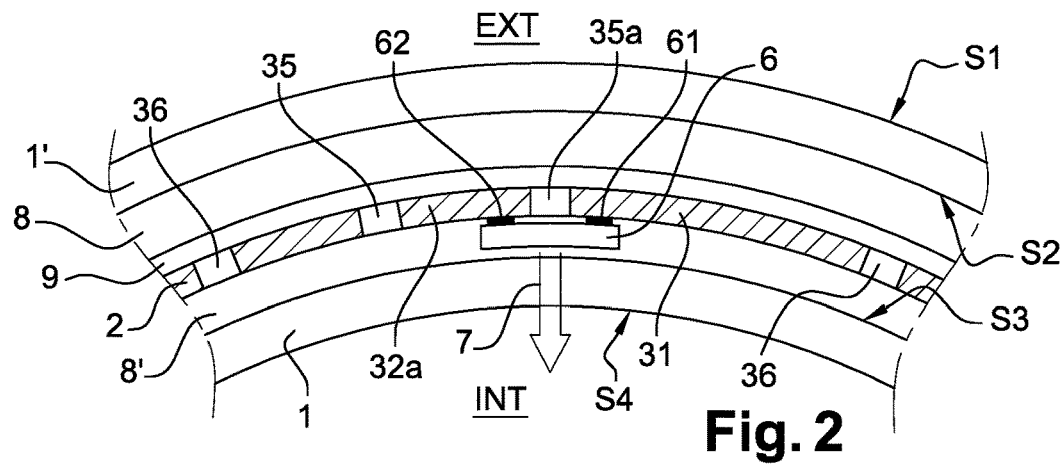
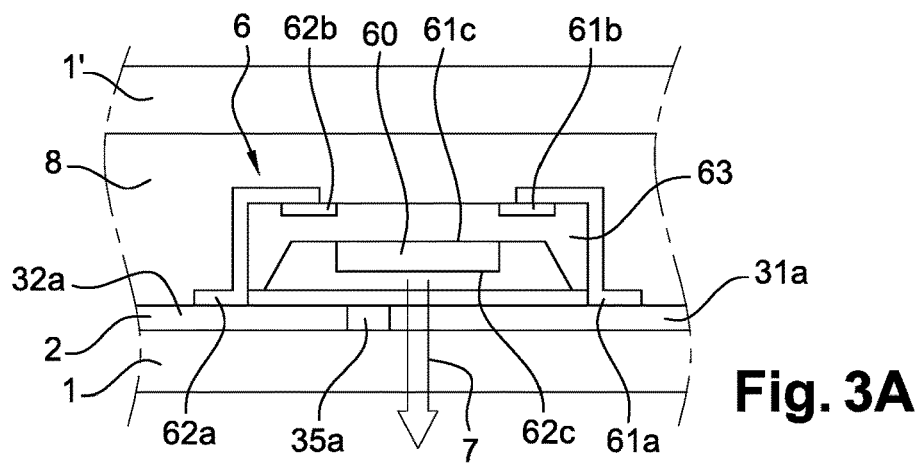
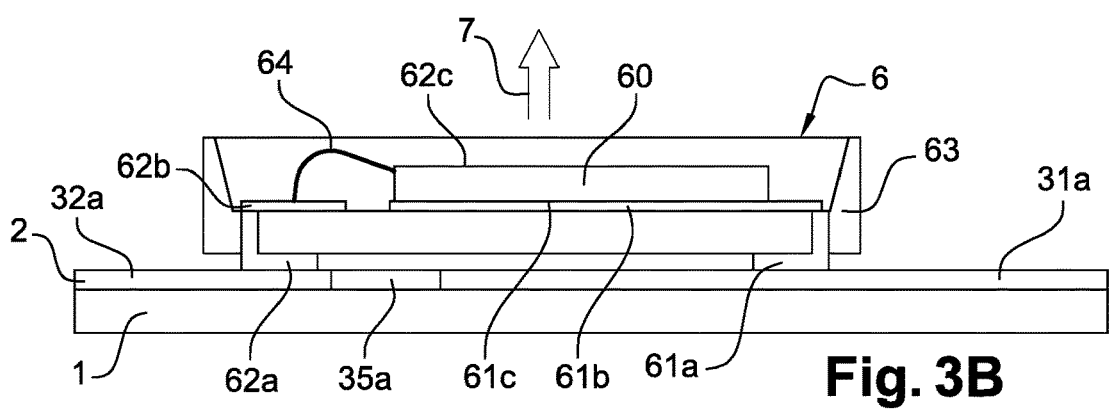
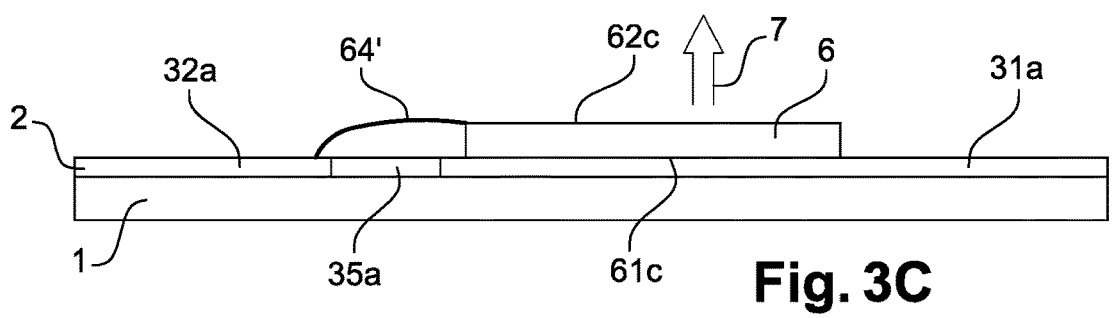

TOUCH CONTROL GLAZING WITH A CAPACITIVE TOUCH SENSITIVE DEVICE AND A LIGHT EMITTING DIODE AND THE MANUFACTURING

CROSS-REFERENCE TO RELATED APPLICATIONS

This application is the U.S. National Stage of PCT/IB2017/000906, filed Jun. 29, 2017, which in turn claims priority to French patent application number 16305795 filed Jun. 29, 2016. The content of these applications are incorporated herein by reference in their entireties.

TECHNICAL FIELD OF THE INVENTION

The invention relates to a touch control glazing including a touch sensitive device and a light emitting diode, and a method for manufacturing said glazing.

BACKGROUND OF THE INVENTION

Nowadays, glazing which integrates a switch device, in the form of a touch sensitive device, are being developed. The touch sensitive device enables to control a functional element.

The touch sensitive device is formed by an arrangement of two coupled electrodes arranged on the same layer or on different layers. In the case for example of a capacitive touch sensitive device, when it is approached by a human finger, the capacitance between the two coupled electrodes changes. The capacitance change is measured by a circuit arrangement and when a threshold value is exceeded, a switching signal is triggered.

As described in WO2015/162107A1, a light source such as a light emitting diode is indicating the position of the touch sensitive device. However, there are significant drawbacks, such as alignment problems during the manufacturing process of the glazing.

SUMMARY OF THE INVENTION

The present invention aims to solve the problems that have just been described above by proposing an improved integration of a touch sensitive device and a light emitting diode indicator into the glazing.

Thus, a first aspect of the present invention relates to a touch control glazing notably for vehicle and notably for automotive, comprising:
  a first transparent glazing, preferably of mineral glass, preferably bent if for vehicle (automotive);
  an electrically conductive layer applied on a first main surface of the first transparent glazing, preferably transparent (enabling vision) if in a transparent zone of the touch control glazing, or optionally in a (local) peripheral area with a masking layer, like enamel layer, on the first main surface or on the second main surface;
  a capacitive touch sensitive device, notably supplied by alternative source, comprising a touch sensitive structure formed in the electrically conductive layer, the touch sensitive structure comprising a ground electrode and a touch electrode having a touch sensitive area; the touch electrode being surrounded by the ground electrode, the touch electrode and the ground electrode being electrically insulated from one another by a dividing line,
  a light emitting diode arranged on the electrically conductive layer to indicate the touch sensitive area -and preferably also the state (on/off or even which level) of the function of a functional element preferably linked to the touch control glazing notably on the side of to the first main face (better than on the side of the second main face)-, the light emitting diode having a light emitting surface facing at least partially the touch sensitive area, the light emitting diode having a first terminal being an first electrode zone electrically connected to the ground electrode and a second terminal being a second electrode zone electrically connected to the touch sensitive area.

In the context of the invention, the term transparent means that the transmittance of light comprised in the visible spectral range is preferably greater or equal to 70% and even to 80% or to 90%. However, when the visibility through the glazing is not recommended, the light transmittance may be much lower, for example, greater than 1% or than 5%.

The light emitting diode and the touch sensitive structure are arranged in such a way that thus there is no need to align an additional layer with the electrically conductive layer, which simplifies the manufacturing process. Besides, the thickness of the touch control glazing can be reduced. There is no other layer arranged between the touch sensitive structure and the light emitting diode. Moreover, in this configuration, there are fewer components, such as connectors or wires, than previously. This results, combined with the simplification of the manufacturing process, in a reduction in the manufacturing cost.

The first transparent glazing preferably contains prestressed, partially prestressed, or non-prestressed glass, particularly preferably flat glass, float glass, quartz glass, borosilicate glass, soda lime glass, or clear plastics, in particular polyethylene, polypropylene, polycarbonate, polymethyl methacrylate, polystyrene, polyamide, polyester, polyvinyl chloride, and/or mixtures thereof.

The thickness of the first transparent glazing may vary widely and thus be ideally adapted to the requirements of the individual case. The first transparent glazing preferably has a thickness lower to 10 mm and even to 8 mm and particularly preferably lower to 5 mm and very particular lower than 3 mm for automotive applications (notably land road vehicle) and even lower than 1.1 mm. This first transparent glazing can be tempered notably chemically tempered if the thickness is lower than 1.1 mm. It could be the inner glazing of a laminated glazing preferably with a second transparent glazing having thicker thickness. The area of the first transparent glazing may vary widely, for example, from 100 cm² to 18 m². Preferably, the first transparent glazing has an area from 400 cm² to 4 m², as is common for motor vehicle glazings and for structural and architectural glazings.

The touch control element can comprise a functional element controlled by the touch sensitive device said functional element being chosen among lighting source like a set of inorganic light emitting diodes, heating element, a suspended particle device, a liquid crystal device, an electrochromic device, a display device, a locking system of a vehicle (roof, trunk, door etc) or building, wipers or air conditioning of a vehicle.

The light emitting diode can be able to indicate the state of a functional element preferably linked to the touch control glazing, notably on the side of to the first main face.

In case of building notably, the first transparent glazing could be used alone (partition, etc) or even could be a roof of vehicle (plastic roof like polycarbonate roof for example) or even a rear window or sidelite of a vehicle. The first transparent glazing could be flexible (plastic foil or thin glass sheet) or not. This first transparent glazing could be also a part of a multiple insulating glazing usually double glazing unit or triple glazing unit. It is preferred that this first transparent glazing is the inner glazing.

This first transparent glazing could be also a part of a multiple insulating glazing, usually double glazing unit, of a refrigerated door.

In a preferred embodiment, notably configured to form a vehicle windshield or roof or side window, or a door or window for a building, the touch control glazing being a laminated glazing comprising a second transparent glazing preferably made of mineral glass, laminated to the first transparent glazing via an intermediate layer made of thermoplastic material, the first transparent glazing having a second main surface opposed to the first main surface, the second transparent glazing having a first main surface and a second main surface opposed to the first main surface on the side of the laminated layer, the electrically conductive layer being disposed between the first main surface of the first transparent glazing and the second main surface of the second transparent glazing.

In case of building, the laminated glazing could be also a part of a multiple insulating glazing usually double glazing unit or triple glazing unit. It is preferred that this first transparent glazing is the most inner glazing.

The vehicle can be an individual road land vehicle (car . . . ) or a transportation vehicle by water (boat), land (truck, bus, tramway, rail vehicle), or air (aircraft). The invention is preferred for a (land, road) vehicle windshield or roof or even a side window (for functional element being heating or lighting source notably) or a door or window for a building.

In peculiar, the touch control glazing is notably configured to form a vehicle windshield or roof or a door or window for a building, the touch control glazing being a laminated glazing comprising a second transparent glazing laminated to the first transparent glazing via an intermediate layer, of thermoplastic material. The electrically conductive layer is disposed between the first transparent glazing and the second transparent glazing. The first transparent glazing has a second main surface opposed to the first main surface, the second main surface of the first transparent glazing being intended to be oriented toward the inside of the vehicle or the building. The second transparent glazing has a first main surface intended to be oriented toward the outside of the vehicle or the building and a second main surface opposed to the first main surface.

The intermediate layer preferably contains at least one thermoplastic plastic, preferably polyvinyl butyral (PVB), ethylene vinyl acetate (EVA), and/or polyethylene terephthalate (PET). However, the thermoplastic intermediate layer may also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene propylene, polyvinyl fluoride, and/or ethylene tetrafluoroethylene, or copolymers or mixtures thereof. The thermoplastic intermediate layer may be formed by one or even by a plurality of thermoplastic films arranged one above the other, with the thickness of one thermoplastic film preferably not more than 1 mm notably from 0.25 mm or 0.5 mm to 1 mm or 0.9 mm, typically around 0.4 mm or 0.7 mm.

For land vehicle, it is preferably polyvinyl butyral (PVB). For roof or side window or windshield, it could be acoustical PVB, tinted or not. For windshield, it could be wedge PVB, tinted or not, acoustical or not.

The second transparent glazing preferably contains prestressed, partially prestressed, or non-prestressed glass, particularly preferably flat glass, float glass, quartz glass, borosilicate glass, soda lime glass, or clear plastics, in particular polyethylene, polypropylene, polycarbonate, polymethyl methacrylate, polystyrene, polyamide, polyester, polyvinyl chloride, and/or mixtures thereof. The second transparent glazing preferably has a thickness lower to 10 mm and even to 8 mm and particularly preferably lower to 5 mm and very particular lower than 3 mm for automotive applications (notably car). This second transparent glazing can be tempered. As for the first transparent glazing, The area of the second transparent glazing may vary widely, for example, from 100 $cm^2$ to 18 $m^2$. Preferably, the second transparent glazing has an area from 400 $cm^2$ to 4 $m^2$, as is common for motor vehicle glazings and for structural and architectural glazings. We prefer choosing first and second glazing having the same size.

By way of example, a touch control laminated glazing for (land, road, transportation . . . ) vehicle windshield includes:
  the first glazing, made of optionally clear, extra-clear or tinted, especially grey or green, and preferably curved mineral glass forming the exterior glazing pane, with said first and second main surfaces respectively called S1 and S2, of thickness of preferably at most 2.5 mm and even of at most 2 mm—especially 1.9 mm, 1.8 mm, 1.6 mm and 1.4 mm—or even of at most 1.3 mm or at most 1 mm;
  an optionally clear, extra-clear or tinted, especially grey or green, lamination interlayer made of a preferably thermoplastic polymeric material and better still of polyvinyl butyral (PVB), of thickness of at most 1.8 mm, better still of at most 1.2 mm and even of at most 0.9 mm (and better still of at least 0.38 mm and even of at least 0.5 mm), especially set back from the edge face of the first glazing by at most 2 mm and set back from the edge face of a second glazing by at most 2 mm; and
  the second glazing made of preferably curved and preferably clear or extra-clear or even tinted mineral glass forming the interior glazing pane, with said main surfaces called S3 and S4 (the most inner face) respectively, preferably of thickness smaller than that of the first glazing, even of at most 2 mm—especially 1.9 mm, 1.8 mm, 1.6 mm and 1.4 mm—or even of at most 1.3 mm or at most 1 mm, the total thickness of the first and second glazing panes preferably being strictly smaller than 4 mm and even than 3.7 mm, the surfaces S2 and the face S3 being the internal faces of the laminated glazing unit.

It could be also a side window (encompassing vent and quarter windows) of (road, land) vehicle.

In an embodiment of a touch control glazing according to the invention, the light emitting diode is arranged over the dividing line.

In a preferred embodiment, the dividing line is patterned so that the ground electrode comprises a ground path protruding into the touch sensitive area. The ground path is delineated by a first part of the dividing line. The light emitting diode is arranged over the first part of the dividing line, the first terminal of the light emitting diode being electrically connected to the ground path.

The touch sensitive area has a given width. Preferably, the ground path has a length less than or equal to the width of the touch sensitive area.

Preferably, the touch sensitive area has a shape symmetrical with respect to a centre point, the light emitting diode being preferably arranged (substantially) over the centre point.

In a more preferred embodiment of the capacitive touch control glazing according to the invention, the electrically conductive layer is configured to form a heating zone, the touch sensitive structure being electrically insulated from the heating zone by a dividing line (another dividing line). The touch sensitive structure and the heating zone are parts of the same electrically conductive layer. Such an arrangement is particularly simple and economical to produce.

The width of the dividing line(s) is preferably from 30 μm to 200 μm and particularly preferably from 70 μm to 140 μm. Such thin dividing lines permit a safe and adequately high, electrical insulation and, at the same time, disrupt vision through the touch control glazing only slightly or not all. The production of the dividing lines is preferably done by laser patterning or chemical or mechanical removal.

Advantageously, the heating zone is connected to at least two busbars intended for connecting to a voltage source such that a current path for a heating current is formed between the busbars. Such a configuration is known, for example, from WO2015162107A1.

The electrically conductive layer preferably contains a transparent electrically conductive coating. Electrically conductive layers according to the invention are known, for example, from DE 20 2008 017 611 U1, EP 0 847 965 B1, or WO2012/052315 A1. They typically contain one or a plurality, for example, two, three, or four electrically conductive, functional layers. The functional layers preferably contain at least one metal, for example, silver, gold, copper, nickel and/or chromium, or a metal alloy. The functional layers particularly preferably contain at least 90 wt. % of the metal, in particular at least 99.9 wt. % of the metal. The functional layers may be made of the metal for the metal alloy. The functional layers particularly preferably contain silver or a silver-containing alloy. Such functional layers have particularly advantageously electrical conductivity and, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are obtained.

Typically, at least one dielectric layer is arranged in each case between two adjacent functional layers of the electrically conductive layer. Preferably, another dielectric layer is arranged below the first and/or above the last functional layer. A dielectric layer contains at least one individual layer made of a dielectric material, for example, containing a nitride such as silicon nitride or an oxide such as aluminium oxide. Dielectric layers may, however, also contain a plurality of individual layers, for example, individual layers of a dielectric material, smoothing layers, matching layers, blocker layers, and/or antireflection layers. The thickness of a dielectric layer is, for example, from 10 nm to 200 nm.

This layer structure is generally obtained by a sequence of deposition operations that are performed by a vacuum method such as magnetic field-supported cathode sputtering.

Other suitable electrically conductive layers are transparent conductive oxide (known as TCO) notably indium tin oxide (ITO) layer, fluorinated tin oxide ($SnO_2$:F) laer, or gallium and or/aluminium-doped zinc oxide (ZnO:Al; ZnO:Ga) . . . The electrically conductive layer may, in principle, be any coating that can be contacted electrically. If the touch control glazing according to the invention is intended to enable vision through it, such as is the case, for example, for glazing in the window area, the electrically conductive layer is preferably transparent. In an advantageous embodiment, the electrically conductive layer is a layer or a layer structure of a plurality of individual layers with a total thickness less than or equal to 2 μm, particularly preferably less than or equal to 1 μm or even less than 300 nm or 100 nm.

The electrically conductive layer preferably has a sheet resistance from 0.4 ohm/square to 200 ohm/square. Indeed, the touch sensitive structure of the touch sensitive device has to transport only low currents, thus the sheet resistance of the layer may be selected in a wide range of values. An advantageous electrically conductive layer according to the invention has a sheet resistance from 0.4 ohm/square to 10 ohm/square. In a particularly preferred embodiment, the electrically conductive layer according to the invention has a sheet resistance from 0.5 ohm/square to 1 ohm/square. Coatings with such sheet resistances are particularly suited for heating vehicle window glazings with typical on-board voltages from 12 V to 48 V or, in the case of electric vehicles, with typical on-board voltages of as much as 500 V.

The electrically conductive layer may be transparent and extend over (substantially) the entire surface of the first transparent glazing (sometimes except any removal at peripheral edge(s) for example, notably behind masking layer on S4 or S3 or between masking layer(s) on S2 and also S3 or S4), with some local removal(s) possible (insolating line(s) preferably invisible or nearly invisible, for letting electromagnetic waves going through etc). However, alternatively, the electrically conductive layer may extend over only a part of the surface of the first transparent glazing (being local) and even wherein this is a masking layer (enamel) or S4 (or S3) and even on S2 for a laminated glazing. In this case the electrically conductive layer is for example opaque, can be metallic like copper. Moreover it could be in a local carrier which is not for example a transparent carrier, notably any printed circuit card (PCB).

The electrically conductive layer may be transparent and extend over (substantially) the entire surface of the first transparent glazing or being local. The electrically conductive layer is thus preferably being chosen among a heating element, a solar control layer, a low E layer, the electrically conductive layer in contact with the first main surface of the first transparent glazing or not in contact (separated by thermoplastic layer like PVB for example).

In a laminated glazing for vehicle (for touch control form inner side of vehicle, It is preferred that electrically conductive layer is closest to first transparent glazing that to second transparent glazing (exterior glazing). We can choose the thickness of PVB and exterior glazing to this purpose. More broadly switching from outside could be not possible due to sensitivity adaption and/or PVB and thicker outer (external) glazing in direction away from the user.

The electrically conductive layer preferably extends over at least 50%, particularly preferably over at least 70%, and most particularly preferably over at least 90% of the surface of the first transparent glazing. The electrically conductive layer may have one or a plurality of uncoated zones. These zones may be transparent to electromagnetic radiation and are known, for example, as a data transmission windows or communication windows.

In an advantageous embodiment of a touch control glazing according to the invention as a laminated glazing, the interior-side surface of the first transparent glazing (S3) has a circumferential edge region with a width from 2 mm to 50 mm, preferably from 5 mm to 20 mm, which is not provided with the electrically conductive layer. The electrically conductive layer in this case has no contact with the atmosphere and is advantageously protected in the interior of the pane by the thermoplastic intermediate layer (PVB etc) against damage and corrosion.

The touch control glazing according to the invention includes a first glazing, on which an electrically conductive layer is arranged. Depending on the type of layer, it is advantageous to protect the layer with a protective layer, for example, a lacquer, a polymer film, and/or a second transparent glazing.

In an advantageous embodiment of the touch control glazing according to the invention, the capacitive touch sensitive device comprises a sensor electronics assembly configured to control the touch sensitive structure, and a voltage source (preferably DC voltage source) configured to supply power voltage to the light emitting diode through the touch sensitive structure. The sensor electronics assembly and/or the voltage source are preferably disposed outside the first transparent glazing, more preferably in a peripheral zone of the first glazing (one edge). Advantageously, the capacitive touch sensitive device comprises a first linear, electrically conductive element connecting the sensor electronics assembly and the voltage source to the ground electrode, and a second linear, electrically conductive element connecting the sensor electronics assembly and the voltage source to the touch electrode on one side.

The linear, electrically conductive elements are preferably electrically conductive wires. If needed, the wires are advantageously implemented very thin such that they do not or only slightly impair vision through the touch control glazing. Preferred wires have a thickness less than or equal to 0.25 mm, particularly preferably from 0.02 mm to 0.15 mm. The wires are preferably metallic, contain in particular copper, tungsten, gold, silver, or aluminium or alloys of at least two of these metals or are made therefrom. The alloys may also contain molybdenum, rhenium, osmium, iridium, palladium, or platinum.

The wires are preferably electrically insulated, for example, by sheathing electrical insulation made of plastic. This is particularly advantageous if the wires run on the electrically conductive layer or other electrically conductive elements of the touch control glazing.

The touch sensitive structure preferably has an area from 1 cm$^2$ to 200 cm$^2$, particularly preferably from 1 cm$^2$ to 10 cm$^2$. The touch sensitive area may, for example, have the shape of an oval, an ellipse or a circle, a triangle, a rectangle, a square, or another type of quadrilateral or a higher polygon.

In an advantageous embodiment, the capacitive touch sensitive device comprises means for controlling the operation of the light emitting diode and the voltage source. Advantageously, the means for controlling the operation of the light emitting diode and the voltage source are connected in series with the light emitting diode and the voltage source.

The ground electrode and the touch electrode can form a capacitor having a capacitance which changes with the proximity or the contact of an object that triggers the touch sensitive device, preferably a human finger or an object whose permittivity is close to that of the human finger. Of course, the touching can be done with one or even multiple fingers or a different part of the human body. In the context of this invention, "touching" means any interaction with the touch sensitive area that results in a measurable change in the measurement signal, i.e., in this case, the capacitance.

The capacitance can be measured via external capacitance sensor electronics. The capacitance change is for example measured by a circuit arrangement or sensor electronics and when a threshold value is exceeded, a switching signal is triggered. Circuit arrangements for capacitive switches are known, for example, from DE 20 2006 006 192 U1, EP 0 899 882 A1, U.S. Pat. No. 6,452,514 B1, and EP 1 515 211 A1. The sensor electronics are preferably capacitive sensor electronics.

The switching signal issued can be of any type and adapted to the requirements of the respective use. Thus, the switching signal can mean a positive voltage, for example, 12 V, no switching signal can mean, for example, 0 V, and another switching signal can mean, for example, +6 V. The switching signal can also correspond to the voltages CAN_High and CAN_Low customary with a CAN-Bus and change by a voltage value between them. The switching signal can also be pulsed and/or digitally coded.

The sensitivity of the sensor electronics can be determined as a function of the size of the touch sensitive area and as a function of the thickness of the first transparent glazing, intermediate layer(s), and a second transparent glazing in the context of simple experiments.

The light emitting diode (eg an inorganic diode) can produce a continuous or even a flashing light.

In an advantageous embodiment of a touch control glazing according to the invention, the capacitive touch sensitive device comprises a sensor electronics assembly configured to control the touch sensitive structure, and a voltage source, preferably DC voltage source, configured to supply power voltage to the light emitting diode through the touch sensitive structure. The sensor electronics assembly and the voltage source are preferably disposed outside the first glazing. The sensor electronics assembly can be implemented such that upon a touch of the touch sensitive area by a person, a switch signal is generated.

Advantageously, the capacitive touch sensitive device comprises means for controlling the operation of the light emitting diode and the voltage source preferably DC voltage source. Advantageously, the means for controlling the operation of the light emitting diode and the voltage source are connected in series with the light emitting diode and the voltage source.

Moreover, the voltage source, preferably DC voltage source, can be decoupled from the sensor electronics assembly. Preferably the DC voltage source is decoupled by a capacitor from the sensor electronics assembly for example feeding to the touch sensitive structure an alternative switch signal notably at a frequency preferably of at least 60 Hz and more preferably up to 100 Hz.

The touch control glazing according to the invention includes a light emitting diode with which the touch sensitive area is indicated. This is particularly advantageous, especially in the case of transparent, non-visible, or hardly visible touch sensitive area, as this makes it possible to touch the touch sensitive area with certainty and to trigger the switch operation with certainty notably without having additional periphery harming the transparency as the light emitting diode is placed on the same electrically conductive layer. The light emitting diode is advantageous, in particular at night or in the dark, as this makes it possible to find the touch sensitive area quickly. In particular, when using the invention as a vehicle glazing, it is very easy for the driver to find and touch the touch sensitive area without being distracted too long from the traffic situation. The light emitting diode is also able to show the status of the switched function by its intensity (e.g. on/off, for heating layer etc).

The terminals of the light emitting diode may be in direct contact with their respective electrodes. In this case, the light emitting diode may be glued to the electrically conductive layer or held in place by an adhesive layer or by any other suitable means. Alternatively, the terminals may be electrically connected to their respective electrodes by means of solder connections, conductive adhesive or conductive paste. The terminals may also be electrically connected to their respective electrodes by wire bonding.

In an advantageous embodiment of the touch control glazing according to the invention, the light emitting diode is a multicolour light emitting diode comprising a plurality of light emitting semiconductor chips, for example red, green and blue. Each light emitting semiconductor chip has a first terminal and a second terminal. The touch sensitive structure comprises a plurality of ground paths electrically insulated from one another by dividing lines. Thus, each second terminal is electrically connected to one of the ground paths. The touch sensitive device is intended to control a functional element. Thus, the different colours of the light emitting diode enable for example to indicate different states of the functional element.

The inorganic light emitting diode may be preferably a packaged light emitting diode (more easy to place). Thus it includes a semiconductor chip and is equipped with a peripheral (polymeric or ceramic) package encapsulating the edge face of the electronic component (notably forming reflector part) and even carrying the chip(s) (carrier part with though holes sometimes). Alternatively, the inorganic light emitting diode may be or a chip-on-board light emitting diode.

In a embodiment, the light emitting diode is a reverse mounted (packaged) light emitting diode, which means that the first and second terminals as well as the light emitting surface are disposed on the same side of the light emitting diode.

The inorganic diode is for example based on gallium phosphide or aluminum gallium and gallium nitride.

The width (or length) of a diode with a single semiconductor chip, generally a diode of square shape, is preferably at most 5 mm. The length of a diode with a plurality of semiconductor chips (typically encircled by the package), generally of rectangular shape, is preferably at most 20 mm and better still at most 10 mm.

In an alternative embodiment, the light emitting diode comprises (notably is) an organic light emitting diode (OLED).

Preferably the height of the organic or inorganic light emitting diode is at most 1 mm and even at most 0.8 mm.

The electrically conductive layer may be applied on a carrier bonded to the first transparent glazing.

The carrier could be local or could be preferably both transparent and extends over the surface of the first transparent glazing and the electrically conductive layer is transparent and extends over the surface of the first transparent glazing (and the carrier), and preferably being chosen among a heating element, a solar control layer, a low e layer, the electrically conductive layer being in contact or not with the first main surface S3 of the first transparent glazing.

The carrier—preferably transparent—is preferably a plastic foil—notably a polyethylene terephthalate (PET)—.

It has preferably having a thickness lower than 0.2 mm and even than 0.1 mm in between S2 and S3 of laminated glazing. Said plastic foil is preferably bonded to the first transparent glazing by a thermoplastic sheet like PVB or by adhesive and/or bonded to the second transparent glazing by a thermoplastic sheet like PVB or by adhesive. A preferred case is that it is bonded to the second transparent glazing by a thermoplastic sheet like PVB (electrically conductive layer oriented to S3) and even preferably bonded to the first transparent glazing by a thermoplastic sheet like PVB.

The carrier film preferably contains at least one polyester and/or one polyimide, particularly preferably a thermoplastic polyester, for example, polyethylene naphthalate (PEN) or polyethylene terephthalate (PET). This is particularly advantageous with regard to the stability and workability of the carrier film. The carrier film may be bonded to the first transparent glazing by adhesive means or via an intermediate layer (like PVB), preferably similar to the intermediate layer bonding the second transparent glazing to the first transparent glazing. The thickness of the carrier film is preferably from 10 µm to 1 mm, particularly preferably from 30 µm to 200 µm. In this range of thickness, the carrier film is advantageously stable and readily workable. The length and width of the carrier film can be equal to the length and width of the first transparent glazing. The length and width of the carrier film can also be smaller than the length and width of the first transparent glazing (e.g. PET inlet).

The carrier (which is preferably flexible enough to follow the curvature of a curved laminated glazing unit) may be adhesively bonded or pressed against S2 for the windshield or roof or S3 for a side window In one embodiment, the carrier may even be placed in a region of the front windshield or roof, region in which the exterior glazing is rendered entirely (or partially) opaque by the (outermost) opaque layer, such as a (black) enamel, preferably on S2.

The carrier may be placed in a region, which the interior glazing is rendered opaque by an opaque layer (the innermost) such as a (black) enamel preferably on S4 or even on S3. This opaque layer then includes aperture (by masking on deposition or by removal especially with a laser) at least in line with the light emitting diode diode.

By way of flexible carrier mention may be made of the range of products AKAFLEX® (especially PCL FW) from KREMPEL.

The thinnest possible and even preferably the discreetest possible flexible carrier (minimum width or even transparent), for example including PET, PEN or a polyimide, will be chosen, and, transparent connection tracks may even be chosen (rather than tracks made of copper unless they are made sufficiently thin).

For adhesive bonding to S2 or S3 (of local carrier notably) it is preferably transparent double-sided adhesive of thickness e3 of at most 0.15 mm and better still 0.1 mm and in particular lower than 0.05 mm, the entire surface or a part of the carrier being adhesively bonded In an alternative embodiment, the touch control glazing comprises a plurality of touch sensitive structures A second aspect of the present invention relates to a method for manufacturing a touch control glazing according to the first aspect of the invention, the method comprises the following steps:

applying an electrically conductive layer on a first main surface of a first transparent glazing; notably directly or via a carrier, preferably transparent forming a capacitive touch sensitive structure in the electrically conductive layer, the touch sensitive structure comprising a ground electrode and a touch electrode having a touch sensitive area;

arranging, on the electrically conductive layer, a light emitting diode with which the touch sensitive area and even the state of its function is indicated, the light emitting diode having a light emitting surface facing at least partially the touch sensitive area, the light emitting diode having a first terminal being a first electrode zone electrically connected to the ground electrode and a second terminal being a second electrode zone electrically connected to the touch sensitive area.

The application of the electrically conductive layer may be done by methods known per se, preferably by magnetic field-supported cathode sputtering. This is particularly advantageous with regard to simple, quick, economical, and uniform coating of the first transparent glazing. However, the electrically conductive layer may also be applied, for example, by physical vapor deposition (PVD), chemical vapor deposition (CVD), plasma-enhanced chemical vapor deposition (PECVD), or by wet chemical methods.

After the application of the electrically conductive layer, the first transparent glazing may be subjected to a temperature treatment. The first transparent glazing with the electrically conductive layer is heated to a temperature of at least 200° C., preferably at least 300° C. The temperature treatment may serve to increase the transmittance and/or to reduce the sheet resistance of the electrically conductive layer.

After the application of the electrically conductive layer, the first transparent glazing may be bent, typically at a temperature from 500° C. to 700° C. Since it is technically simpler to coat a flat glazing, this procedure is advantageous if the first transparent glazing is to be bent. Alternatively, however, the first transparent glazing may also be bent before the application of the electrically conductive layer, for example, if the electrically conductive layer is not suited to withstand a bending process without damage.

BRIEF DESCRIPTION OF THE DRAWINGS

The invention will be further explained below by means of exemplary embodiments with reference to the attached figures, in which:

FIG. 2 is a cross-section view along the section line A-A' of an alternative embodiment of a touch control glazing;

FIG. 3A is a cross-section view of a reverse mounted inorganic light emitting diode arranged in a laminated glazing;

FIG. 3B is a cross-section view of a packaged inorganic light emitting diode arranged on an electrically conductive layer;

FIG. 3C is a cross-section view of a chip-on-board inorganic light emitting diode arranged on an electrically conductive layer;

The figures are only presented for indicative purposes and in no way limit the invention.

In the figures the same reference numbers denote the same or analogue components.

DETAILED DESCRIPTION

Figure 1A:
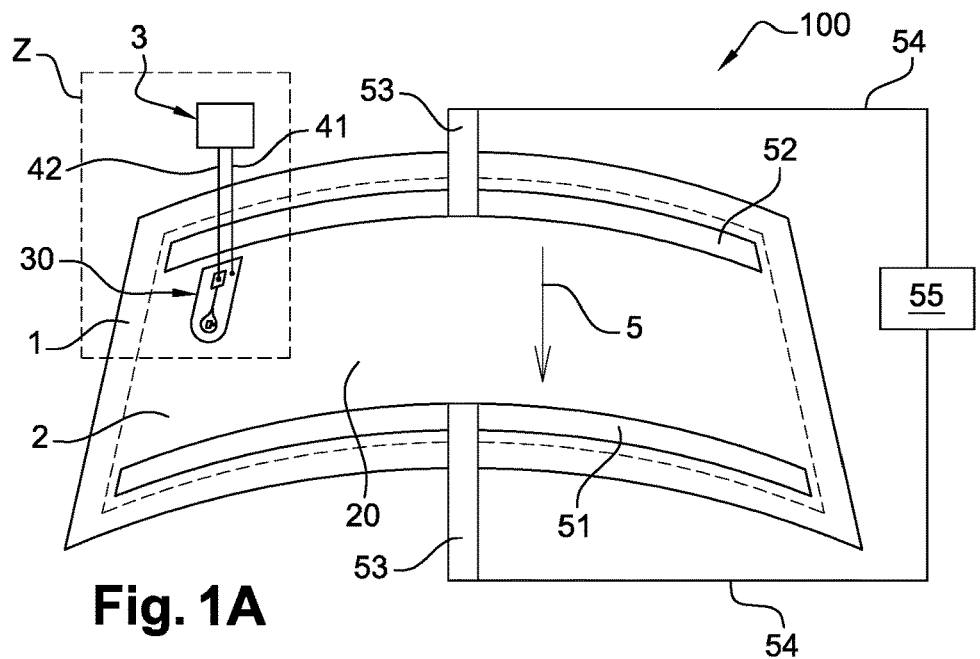
FIG. 1A is a top view of an embodiment of a touch control glazing according to the first aspect of the invention.

FIG. 1A shows an exemplary embodiment of a touch control glazing 100 in the form of a vehicle windshield. The touch control glazing 100 comprises a first transparent glazing 1 made, for example, of mineral glass. An electrically conductive layer 2 is applied on a first main surface of the first transparent glazing 1.

In this embodiment, the electrically conductive layer 2 is applied directly on the first main surface of the first transparent glazing 1. The electrically conductive layer 2 is preferably transparent, thus enabling vision through the touch control glazing 100. The electrically conductive layer 2 is preferably a layer system, which includes, for example, one or severals (like three) electrically conductive silver layers that are separated from each other by dielectric layers (oxide and/or nitride metallic or silicon coats).

The touch control glazing 100 also comprises a capacitive touch sensitive device 3 which includes a touch sensitive surface 30 formed in the electrically conductive layer 2. Now referring to FIG. 1B in addition to FIG. 1A, the touch sensitive structure 30 comprises a ground electrode 31 and a touch electrode 32 having a touch sensitive area 32a. The ground electrode 31 and the touch electrode 32 are both parts of the electrically conductive layer 2. The touch sensitive device 3 is a switch device able to be triggered by the presence of an object, preferably a human finger, contacting or proximal to the touch sensitive area 32a.

The ground electrode 31 and the touch electrode 32 form a capacitor having a capacitance which changes when the object that triggers the capacitive touch sensitive device 3 come close to or comes into contact with the touch sensitive area 32a. The capacitive touch sensitive device 3 comprises a capacitive sensor electronics assembly 33 which measures the capacitance change. When the measured capacitance change is higher than a threshold value set by the sensor electronics assembly 33, a switching signal is triggered. The switching signal enables to control a functional element associated with the touch sensitive device.

The sensor electronics assembly 33, which controls the touch sensitive structure 30, is connected to the ground electrode 31 via a first electrically conductive element 41 and to the touch electrode 32 via a second electrically conductive element 42. The electrically conductive elements 41, 42 may be foil conductors made for example of copper. They are preferably electrically insulated, especially from the electrically conductive layer 2, by sheathing electrical insulation made for example of polyimide.

The touch electrode 32 is surrounded by the ground electrode 31. These two electrodes are electrically insulated from one another by a first dividing line 35, preferably which is a line along which the electrically conductive layer 2 is removed so that there is no electrical conduction from one side of the line to the other side. The first dividing line 35 has a width d1 (shown in FIG. 1C) of, for example, 100 μm and is, for example, introduced into the electrically conductive layer 2 by laser patterning.

Advantageously, the ground electrode 31 is also electrically insulated from the rest of the electrically conductive layer 2 by a second dividing line 36, preferably similar to the first dividing line 35. Thus, the rest of the electrically conductive layer 2 can be used for another application. In this embodiment the rest of the electrically conductive layer 2 is configured to form a heating zone 20. Indeed, if a current is passed through the electrically conductive layer 2, it is heated due to its electrical resistance and Joule heat generation. Consequently, the electrically conductive layer 2 can be used for active heating of the touch control glazing 100.

Preferably, for the electrical contacting of the heating zone 20, a first busbar 51 is arranged in the lower edge zone of the heating zone 20 and a second busbar 52 is arranged in the upper edge zone of the heating zone 20. The busbars 51, 52 contain, for example, silver particles and are applied by screen printing and subsequently fired. The length of the busbars 51, 52 corresponds approximately to the dimension of the electrically conductive layer 2. Both busbars 51, 52 are approximately parallel.

When an electrical voltage is applied to the busbars 51, 52, a uniform current 5 flows through the electrically conductive layer 2 of the heating zone 20 between the busbars 51, 52. Approximately in the center of each busbar 51, 52, a foil conductor 53 is arranged. The foil conductors 53 are electrically connected to the busbars 51, 52 via a contact surface, for example by means of a solder material, an electrically conductive adhesive, or by simple placement and contact pressure within touch control glazing 100. The foil conductors 53 contain, for example, a tin-plated copper foil having a width of 10 mm and a thickness of 0.3 mm. The busbars 51, 52 are connected via the foil conductors 53 through supply lines 54 to a voltage source 55, which provides standard on-board voltage for motor vehicles, preferably from 12 V to 15 V and, for example, approximately 14 V. Alternatively, the voltage source 55 may also have higher voltages, for example from 35 V to 45 V, and in particular 42 V.

Advantageously, the heating zone 20 is a functional element controlled by the touch sensitive device 3. When the switching signal is triggered due to the operation of the capacitive touch sensitive device 3, the heating zone 20 is turned on or turned off.

In this embodiment, the touch electrode 32 comprises three different zones: the touch sensitive area 32*a* situated at an extremity of the touch electrode 32, a connection area 32*b* situated at another extremity of the touch electrode 32 and to which the sensor electronics assembly 35 is connected via the second electrically conductive element, and a supply line zone 32*c* which electrically conductively connects the touch sensitive area 32*a* to the connection area 32*b*. The touch sensitive area 32*a* is substantially drop-shaped and transitions into the supply line zone 32*c*. The term "drop-shaped" means that the touch sensitive area 32*a* is substantially circular and tapers funnel-like on one side toward the supply line zone 32*c*. The touch sensitive area 32*a* has a width W1 (shown in FIG. 1D) of, for example, 40 mm. The supply line zone 32*c* has for example a width of 1 mm and a length of 48 mm. The connection area 32*b* has a square shape with rounded corners and a width of, for example, 12 mm. The square is advantageous to place and contact a foil conductor to the shape.

The supply line zone 32*c* is not sensitive due to its small dimensions and its small capacitance change when touched, and so it helps to lead to the touch sensitive area 32*a* to a desired position. Furthermore, the sensor electronics assembly 33 connected to the touch sensitive structure 30 may also be selected in its sensitivity such that only upon touching a zone of the touch control glazing 100 in the region of the touch sensitive area 32*a*, a capacitive field is formed. In contrast, a touching of the touch control glazing 100 above the supply line zone 32*c* triggers no switching signal.

A light emitting diode 6 is arranged on the electrically conductive layer 2 to indicate the touch sensitive area 32*a*. The light emitting diode 6 has a light emitting surface facing at least partially the touch sensitive area 32*a*. In this context, the term facing refers to an orthogonal projection of the light emitting surface in the plane of the touch sensitive area 32*a*. Indeed, in this embodiment, the light emitting surface is facing the touch sensitive area 32*a*, as represented by the arrow 7 in FIG. 1C. However, in another embodiment (shown in FIG. 2), the light emitting surface may be facing the opposite direction. The light emitting surface is oriented toward the side of the first transparent glazing 1 from which the touch sensitive area 32*a* is intended to be touched.

The light emitting diode 6 is connected in the forward direction. In other words, the light emitting diode 6 has a first terminal 61, electrically connected to the ground electrode 31 and a second terminal 62 electrically connected to the touch electrode 32. The first terminal 61 is first electrode zone and the second terminal 62 is a second electrode zone.

The terminals 61, 62 may be in direct contact their respective electrodes. In this case, the light may be glued to the electrically conductive layer 2 or held in place by an adhesive layer or by any other suitable means. Alternatively, the terminals 61, 62 may be electrically connected to their respective electrodes 31, 32 by means of solder connections, conductive adhesive or conductive paste. The terminals 61, 62 may also be electrically connected to their respective electrodes 31, 32 by wire bonding.

Advantageously, the touch sensitive device 3 comprises a voltage source 37, preferably DC voltage source, which supplies power voltage to the light emitting diode 6 through the touch sensitive structure 30. The voltage source 37 has a first terminal connected to the touch electrode 32 via the second electrically conductive element 42 and a second terminal connected to the ground electrode 31 via the first electrically conductive element 41. Thus, there is no need for independent electrically conductive connectors for the light emitting diode, which results in manufacturing cost savings as well as in a simplified manufacturing method. Pn peculiar, by help of separate the touch signals from the supply voltage of the light emitting diode 6, it was surprisingly possible to let the illumination and the touch work having a common circuit.

The voltage source 37, preferably DC voltage source, is preferably decoupled from the sensor electronics assembly 33, for example by a capacitor 39 or by any suitable decoupling means. Thus, the voltage source 37 and the sensor electronics assembly 33 do not influence each other.

The touch sensitive device 3 preferably comprises means 38 for controlling the operation of the light emitting diode 6 and the voltage source 37, preferably DC voltage source 37. Thus, the light emitting diode 6 is not necessarily always turned on. For example, thanks to the controlling means 38, the light emitting diode 6 may be turned on during night time, when it is most needed, and turned off during day time. In this embodiment, the controlling means 38 are connected in series with the light emitting diode 6 and the voltage source 37.

Figure 1B:
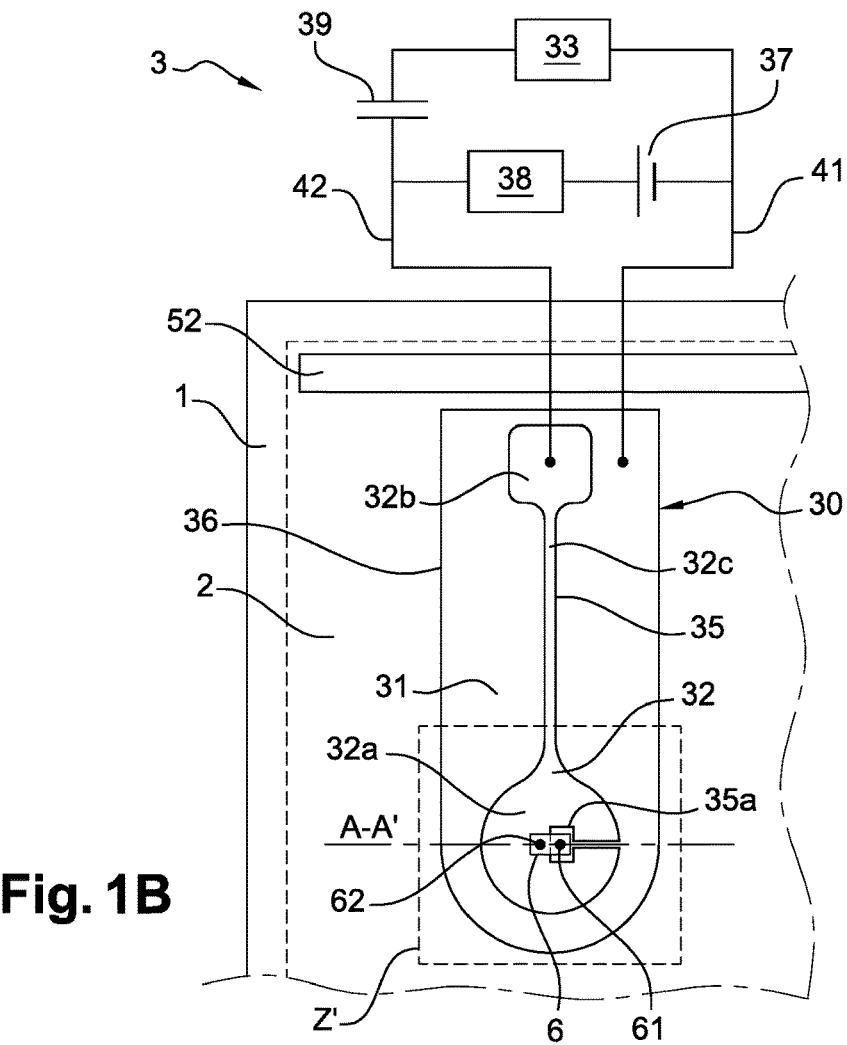
FIG. 1B is an enlarged view of the detail Z of FIG. 1A.
Figure 1C:
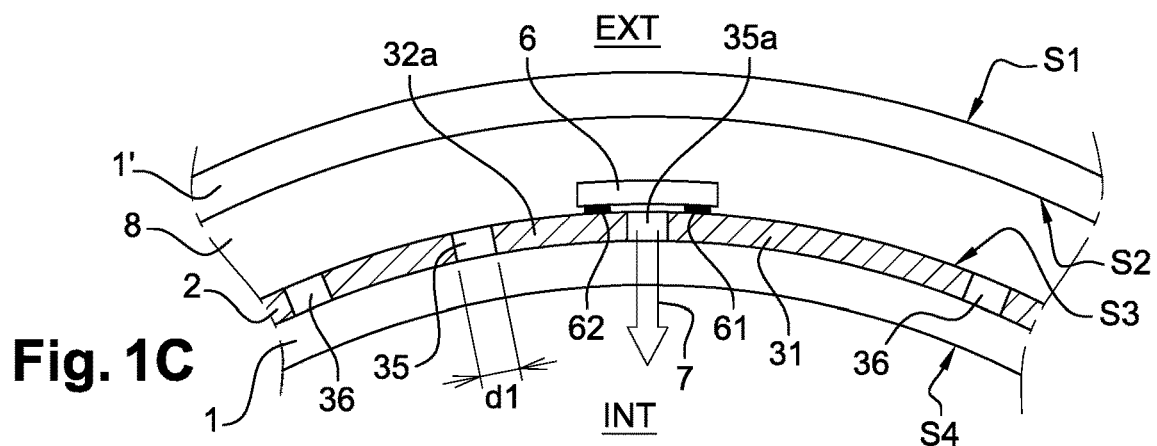
FIG. 1C is a cross-section view along the section line A-A' of FIG. 1B.

FIG. 1C is a cross-section view along the section line A-A' of FIG. 1B. In this embodiment of a touch control glazing 100 as a vehicle windshield, the touch control glazing 100 is a laminated glazing comprising a second transparent glazing 1' bonded together to the first transparent glazing 1 by an intermediate layer 8 made of thermoplastic material. The second transparent glazing 1' is preferably made of mineral glass. The intermediate layer 8 is for example made of polyvinyl butyral (PVB). In the laminated glazing, the (inorganic) light emitting diode 6 and the electrically conductive layer 2 are protected from damage. Moreover, the intermediate layer 8 enables to obtain safety glass.

The first glazing 1 and the second glazing 1' each have a first main surface and a second main surface opposed to the first main surface. In this embodiment, the second main surface of the first transparent glazing 1, known in the field as surface S4, is intended to be oriented toward the inside INT of the vehicle. Similarly, the first main surface of the second glazing 1', known in the field as surface S1, is intended to be oriented toward the outside EXT of the vehicle. The first main surface of the first transparent glazing 1 and the second main surface of the second transparent glazing 1' are inner-side surfaces of the laminated glazing and are respectively known in the field as surface S3 and surface S2.

In this configuration, the touch sensitive device 3 is intended to be triggered from the inside INT of the vehicle. To prevent switching from the outside EXT of the vehicle, the sensitivity of the sensor electronics assembly 33 may be adapted. It is also possible to increase the thickness of the intermediate layer 8 and/or the thickness of the second glazing 1'.

Figure 1D:
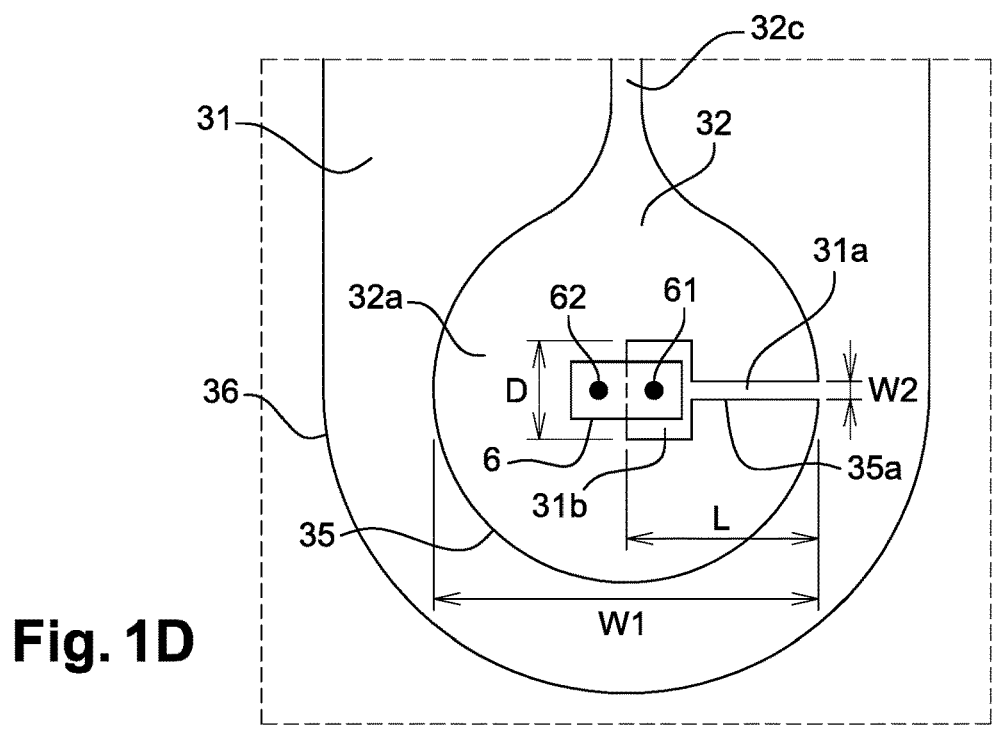
FIG. 1D is an enlarged view of the detail Z' of FIG. 1B

FIG. 1D shows an enlarged view of the detail Z' of FIG. 1B. The first dividing line 35 is preferably patterned so that the ground electrode 31 comprises a ground path 31a protruding into the touch electrode 32. The ground path 31a is delineated by a first part 35a of the dividing line 35. The light emitting diode 6 is arranged over the first part 35a of the dividing line 35, the first terminal 61 of the light emitting diode 6 being electrically connected to the ground path 31a. In this embodiment, the ground path 31a extends inside the touch sensitive area 32a. Thus, the light emitting diode 6 may be arranged over the touch sensitive area 32a, all along the ground path 31a. Therefore the illumination of the touch sensitive area 32a may be optimized by positioning the light emitting diode 6 in an adequate manner.

The ground path 31a has preferably a width W2 so that the sensitivity of the touch sensitive area 32a is not significantly reduced. At the end of the ground path 31a, a ground area 31b may be arranged to facilitate the connection with the first terminal 61 of the light emitting diode 6. For this purpose, the ground area 32b has at least a dimension D greater than the width W2 of the ground path 31a. This ground area 31b may have any suitable shape, such as a square, a rectangular or a circle.

In a preferred embodiment, the ground path 31a has a length L less than or equal to the width W1 of the touch sensitive area 32a to avoid losing too much sensitive surface. The reduction of the touch sensitive area 32a is limited, thus its sensitivity remains nearly unchanged.

The touch sensitive area 32a has preferably a shape symmetrical with respect to a centre point. In this case, the light emitting diode 6 is preferably arranged over the centre point with the aim of optimizing the illumination of the touch sensitive area 32a.

Figure 1E:
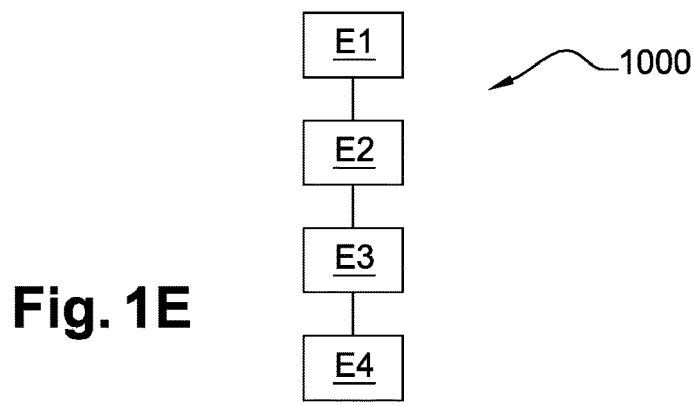
FIG. 1E is a flow chart of an embodiment of the method for manufacturing the touch control glazing of FIG. 1A according to the second aspect of the invention.

FIG. 1E shows a flow chart of an embodiment of the method 1000 for manufacturing the touch control glazing 100 of FIG. 1A according to the second aspect of the invention. The method 100 comprises a step E1 of applying the electrically conductive layer 2 on the first main surface S3 of the first transparent glazing 1. The electrically conductive layer 2 is preferably applied by magnetic field-supported cathode sputtering. This is particularly advantageous with regard to simple, quick, economical, and uniform coating of the first transparent glazing 1.

Then, during a step E2, the ground electrode 31 and the touch electrode 32 of the touch sensitive structure 30 are formed in the electrically conductive layer 2. In this embodiment, this step E2 involves the formation of the dividing lines 35, 36 along which the electrically conductive layer 2 is removed. The dividing lines 35, 36 are preferably formed by laser patterning, which is particularly advantageous since the de-coated lines 35, 36 are visually quite inconspicuous and only little impair the appearance and the view.

The method 1000 also comprises a step E3 of arranging, on the electrically conductive layer 2, the light emitting diode 6 with which the touch sensitive area 32a is illuminated. Preferably, the light emitting diode 6 is arranged after the step E2 of forming the touch sensitive structure 30 so as not interfere with this step E2. Otherwise, the light emitting diode 6 could for example block the laser beam or be damaged during the step E2 of forming the touch sensitive device 30.

Advantageously, the method 1000 comprises an additional step E4 of arranging the second transparent glazing 1' bonded to the first transparent glazing 1 via the intermediate layer 8. The bonding of the first transparent glazing 1 and the second transparent glazing 1' is preferably done under the action of heat, vacuum, and/or pressure.

Figure 1F:
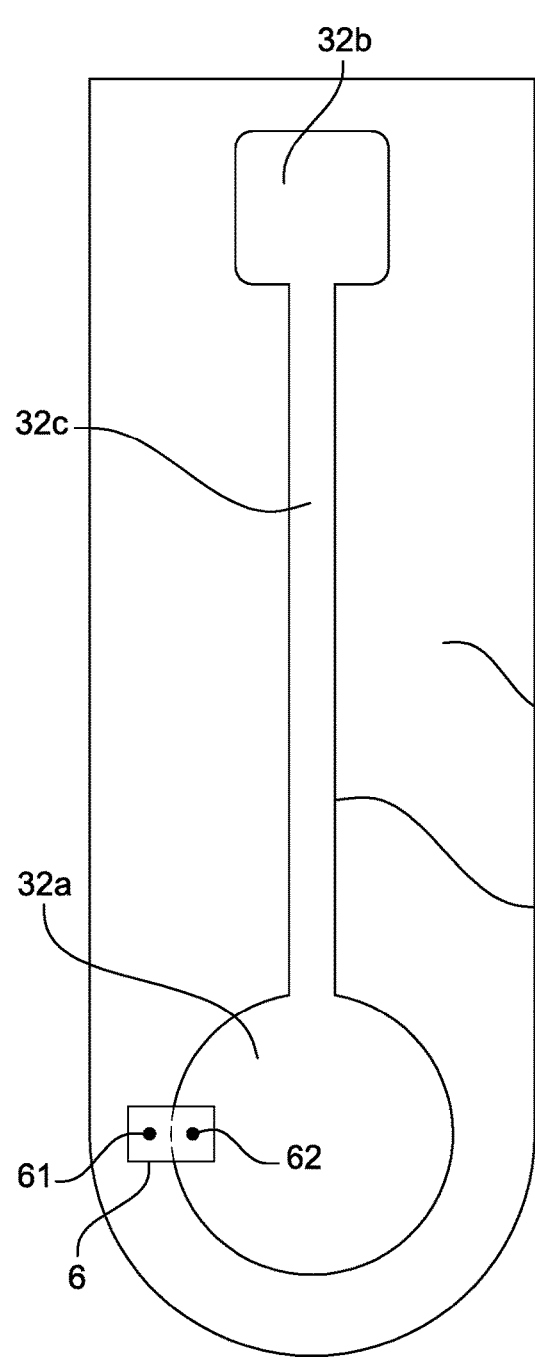
FIG. 1F is a detailed view of an alternative embodiment of the touch control glazing of FIG. 1A.

In an alternative embodiment, shown in FIG. 1F, the light emitting diode 6 is arranged over the dividing line 35, on an edge of the touch sensitive area 32a. Thus, there is no need to form a ground path inside the touch sensitive area 32a. Therefore the manufacturing is simplified but the illumination of the touch sensitive area 32a is not optimal.

Figure 1G:
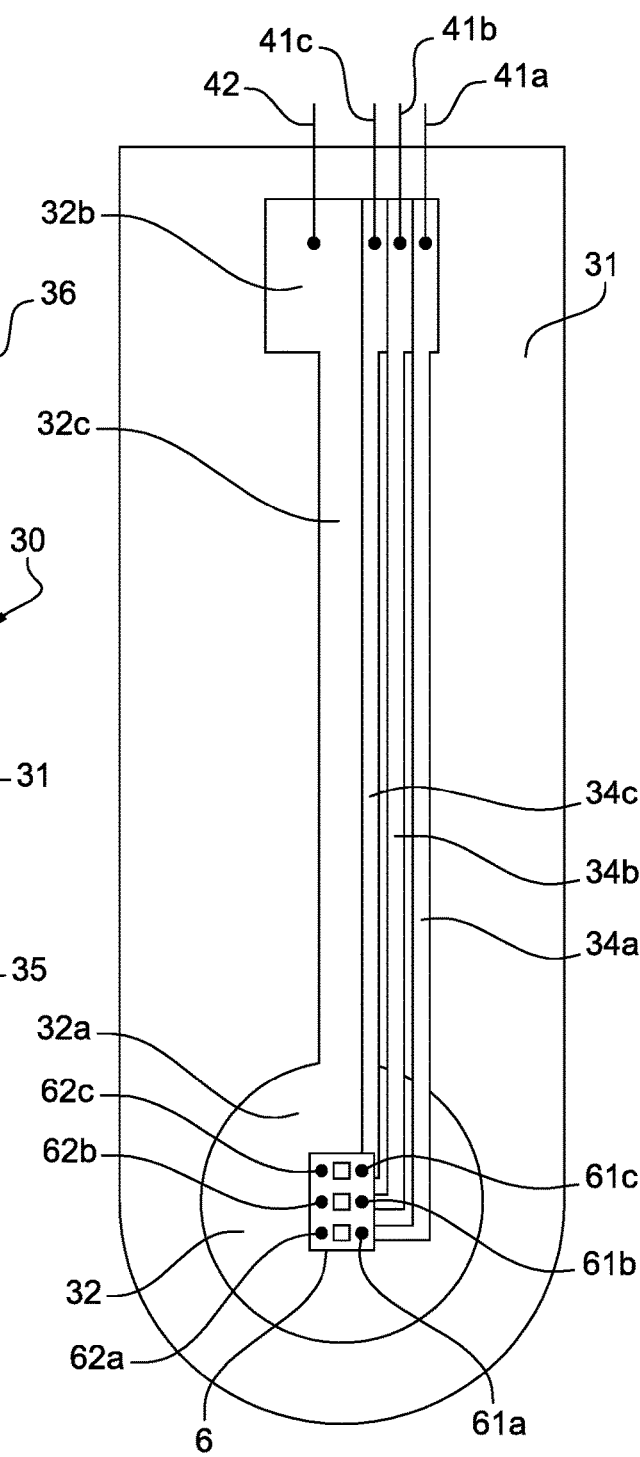
FIG. 1G is a detailed view of another alternative embodiment of the touch control glazing of FIG. 1A.

In another embodiment, shown in FIG. 1G, the light emitting diode 6 is a multicolour light emitting diode. Thus, the state of the touch sensitive device 3, which also represents the state of the functional element associated with it, may be indicated. For example, the multicolour light emitting diode 6 comprises three light emitting semiconductor chips, each one having a first terminal 61a, 61b, 61c and a second terminal 62a, 62b, 62c. In this case, the touch sensitive structure 30 comprises also three ground paths 34a, 34b, 34c electrically insulated from one another by dividing lines. The first terminal 61a, 61b, 61c are respectively electrically connected to one of the ground paths 34a, 34b, 34c. On the contrary, the second terminals 62a, 62b, 62c are all electrically connected to the touch sensitive area 32a. Thus, the light emitting semiconductor chips can be operated separately. Preferably, the ground paths 34a, 34b, 34c are respectively electrically connected to the sensor electronics assembly 33 by electrically conductive elements 41a, 41b, 41c.

Figure 1H:
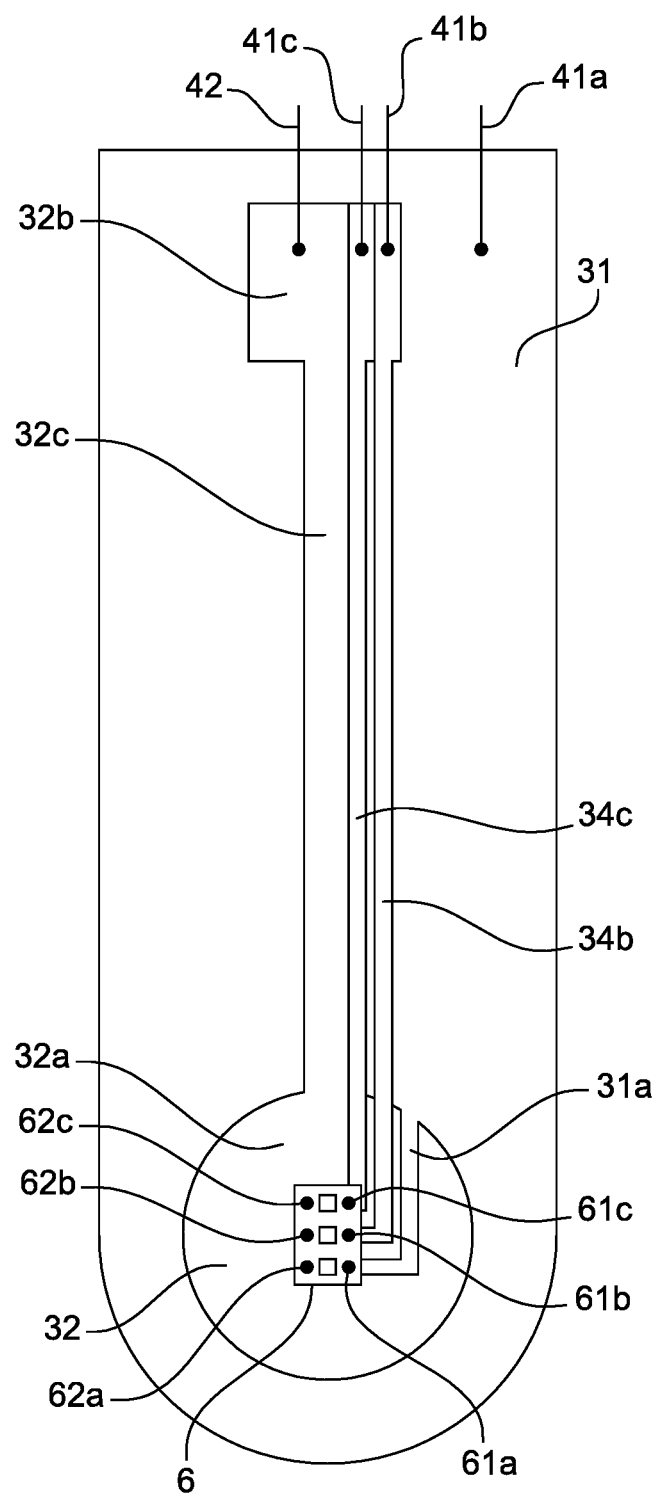
FIG. 1H a detailed view of yet another alternative embodiment of the touch control glazing of FIG. 1A.

FIG. 1H shows yet another embodiment wherein a multicolour light emitting diode 6 comprising three light emitting semiconductor chips is used. As previously described, the touch sensitive structure 30 comprises three ground paths 31a, 34b, 34c with one of the ground paths 31a being formed in the ground electrode 31. The first terminal 61a, 61b, 61c of the multicolour light emitting diode 6 are respectively electrically connected to one of the ground paths 31a, 34b, 34c, and the second terminals 62a, 62b, 62c are all electrically connected to the touch sensitive area 32a. Thus, this embodiment requires less steps to form the dividing lines.

In an alternative embodiment, the light emitting diode 6 has for example only two light emitting semiconductor chips, thus two colours, preferably red and green. Then, when the functional element is turned on, the light emitting diode 6 emits a green light, and when the functional element is turned off, the light emitting diode 6 emits a red light.

FIG. 2 is a cross-section view along the section line A-A' drawn on FIG. 1B of an alternative embodiment of a touch control glazing 100. In this embodiment, the electrically conductive layer 2 is applied on a carrier layer 9 disposed on the first main surface S3 of the first transparent glazing 1. The carrier layer 9 facilitate the application of the electrically conductive layer 2 on the first main surface S3. The carrier layer 9 may be a printed board card (PCB) or a plastic foil, preferably containing polyethylene terephthalate (PET).

In this embodiment, the light emitting diode 6 has a light emitting surface facing the opposite direction of the touch sensitive area 32. Thus, the carrier layer 9 is disposed on the first main surface S3 of the first transparent glazing 1 so that the light emitting surface is oriented towards the inside INT of the vehicle, as represented by the arrow 7. The light emitting diode 6, the electrically conductive layer 2 and the carrier layer 9 form a stack which is advantageously, bonded to the first transparent glazing 1 by an intermediate layer 8', preferably similar to the intermediate layer 8 bonding the second transparent glazing 1' to the first transparent glazing 1.

The carrier layer 9 may extend over the entire surface of the first transparent glazing 1. Alternatively, the carrier layer 9 may extend over only a portion of the surface of the first transparent glazing 1. In the latter case, the intermediate layer 8' bounding the carrier layer 9 (or the stack) to the first transparent glazing 1 is not mandatory and may be replaced by local adhesive means.

In the embodiment of a touch control glazing 100 described in reference with FIG. 1A to FIG. 1H, the light emitting diode 6 is a packaged light emitting diode mounted in reverse, as shown in FIG. 3A. The light emitting diode 6 has a first terminal 61*a*, a second terminals 62*a* and a light emitting surface disposed on the same side of the light emitting diode 6. Thus, the light is emitted towards the inside of the vehicle, where the touch sensitive area 32*a* is intended to be operated. If the electrically conductive layer 2 and the carrier layer 9, when there is one, are not transparent enough to enable the light to go through, a small via hole may be made in these layers, in front of the light emitting surface.

This reverse mounted light emitting diode 6 comprises a first electrically conductive pad 61*b* and a second electrically conductive pad 62*b* disposed on the back (as opposed to the light emitting surface) of the light emitting diode 6. The first electrically conductive pad 61*b* and the second electrically conductive pad 62*b* are electrically connected respectively to the first terminal 61*a* and to the second terminal 62*a*. This packaged light emitting diode 6 also comprises a light emitting semiconductor chip 60 disposed inside a package 63 and having an first electrode 61*c* and a second electrode 62*c* which are electrically connected (not shown) respectively to the first electrically conductive pad 61*b* and to the second electrically conductive pad 62*b*.

In another embodiment, the light emitting diode 6 may be a standard packaged light emitting diode 6 having an emitting surface facing the opposite direction of the touch sensitive area 32*a*, as shown in FIG. 3B. This packaged light emitting diode 6 has a first terminal 61*a* and a second terminal 62*a* disposed on the same side of the packaged light emitting diode 6. Thus, the packaged light emitting diode 6 can be arranged over the first part 35*a* of the dividing line 35. The first terminal 61*a* and the second terminal 62*a* are electrically connected respectively to a first electrically conductive layer 61*b* and a second electrically conductive layer 62*b*. The packaged light emitting diode 6 comprises a light emitting semiconductor chip 60 disposed inside a package 63 and arranged on the first electrically conductive layer 61*b*. The light emitting semiconductor chip 60 has an first electrode 61*c* which is in direct contact with the first electrically conductive layer 61*b*, and a second electrode 62*c* which is electrically connected to the second electrically conductive layer 62*b* by a bonding wire 64.

Alternatively, the light emitting diode 6 may be a chip-on-board light emitting diode 6 as shown in FIG. 3C. In this case, the light emitting diode 6 is a light emitting semiconductor chip arranged directly on the electrically conductive layer 2. Thus, the light emitting diode 6 is arranged on one side of the first part 35*a* of the dividing line 35. The first electrode 61*c* is in direct contact with the ground path 31*a*, and the second electrode 62*c* is electrically connected to the touch sensitive area 32*a* by a bonding wire 64'. This configuration is less reliable but is easier to implement.

Although the present invention has been described more in relation to a heating function, the touch sensitive device is suitable to control a variety of other functional elements which may also be located in a vehicle, such as (rear) wipers or air conditioning. The present invention is also well suited for use in non-automotive glazing such as architectural glazing, any glazing for building (partition, door, window, part of double or triple glazing . . . ).

The sensor electronics assembly can face the first transparent glazing. For a laminated glazing, the sensors electronics assembly can be inside or on the intermediate layer (PVB, EVA etc).

The sensors electronics assembly can comprise an AC (voltage) source configured to supply AC to the touch sensitive structure. Then the DC voltage source can be decoupled from the sensor electronics assembly notably by a capacitor.

The invention claimed is:

1. A touch control glazing comprising:
    a first transparent glazing having a first main surface;
    an electrically conductive layer applied on the first main surface of the first transparent glazing;
    a capacitive touch sensitive device comprising a touch sensitive structure formed in the electrically conductive layer, the touch sensitive structure comprising a ground electrode and a touch electrode having a touch sensitive area, the touch electrode being surrounded by the ground electrode and in a common plane of the conductive layer with the ground electrode, the touch electrode and the ground electrode being electrically insulated from one another by a dividing line formed in the electrically conductive layer;
    a light emitting diode arranged on the electrically conductive layer to indicate the touch sensitive area, the light emitting diode having a light emitting surface facing at least partially the touch sensitive area, the light emitting diode having a first terminal being a first electrode zone electrically connected to the ground electrode and a second terminal being a second electrode zone electrically connected to the touch sensitive area and said first electrode zone disposed around the touch sensitive area and the light emitting indicator diode being within the touch sensitive area, wherein the light emitting diode is arranged over the dividing line.

2. The touch control glazing according to claim 1, wherein the dividing line is patterned so that the ground electrode comprises a ground path protruding into the touch sensitive area, the ground path being delineated by a first part of the dividing line, the light emitting diode being arranged over the first part of the dividing line, the first terminal of the light emitting diode being electrically connected to the ground path.

3. The touch control glazing according to claim 2, wherein the touch sensitive area has a given width, the ground path having a length less than or equal to the width of the touch sensitive area.

4. The touch control glazing according to claim 3, wherein the touch sensitive area has a shape symmetrical with respect to a centre point.

5. The touch control glazing according to claim 1, comprising a functional element controlled by the capacitive touch sensitive device said functional element being chosen among lighting source like a set of inorganic light emitting diodes, heating element, a suspended particle device, a liquid crystal device, an electrochromic device, a display device, a locking system of a vehicle or a building, wipers or air conditioning of a vehicle.

6. The touch control glazing according to claim 1, comprising a functional element controlled by the capacitive touch sensitive device, said functional element being heating zone, the touch sensitive structure and the heating zone being electrically insulated from one another by a dividing line.

7. The touch control glazing according to claim 1, wherein the light emitting diode is configured to indicate the state of a functional element.

8. The touch control glazing according to claim 1 wherein the light emitting diode is an inorganic light emitting diode comprising a light emitting semiconductor chip or a multicolour light emitting diode comprising a plurality of light emitting semiconductor chips, each light emitting semiconductor chip having said first and second terminals, the touch sensitive structure comprising a plurality of ground paths electrically insulated from one another by dividing lines, each said second terminal being electrically connected to one of the ground paths.

9. The touch control glazing according to claim 1, wherein the light emitting diode comprises an organic light emitting diode.

10. The touch control glazing according to claim 1 wherein the touch control glazing is a laminated glazing comprising a second transparent glazing laminated to the first transparent glazing via an intermediate layer made of thermoplastic material, the first transparent glazing having a second main surface opposed to the first main surface, the second transparent glazing having a first main surface and a second main surface opposed to the first main surface on a side of the laminated layer, the electrically conductive layer being disposed between the first main surface of the first transparent glazing and the second main surface of the second transparent glazing.

11. The touch control glazing according to claim 1, wherein the electrically conductive layer is applied directly on the first main surface of the first transparent glazing.

12. The touch control glazing according to claim 1, wherein the electrically conductive layer is transparent and extends over the surface of the first transparent glazing, the electrically conductive layer being in contact or not with the first main surface of the first transparent glazing.

13. The touch control glazing according to claim 1, wherein the electrically conductive layer is applied on a carrier which is disposed on a side of the first main surface of the first transparent glazing.

14. The touch control glazing according to claim 13, wherein the carrier is transparent.

15. The touch control glazing according to claim 1, wherein the capacitive touch sensitive device comprises a sensor electronics assembly configured to control the touch sensitive structure, and a voltage source configured to supply power voltage to the light emitting diode through the touch sensitive structure, the sensor electronics assembly and/or the voltage source being disposed outside the first transparent glazing.

16. The touch control glazing according to claim 15, wherein the voltage source is decoupled from the sensor electronics assembly.

17. The touch control glazing according to claim 1, wherein the capacitive touch sensitive device comprises a controller configured to control operation of the light emitting diode and the voltage source.

18. A method for manufacturing a glazing according to claim 1, the method comprising:
applying an electrically conductive layer on a first main surface of a first transparent glazing;
forming a capacitive touch sensitive structure in the electrically conductive layer, the touch sensitive structure comprising a ground electrode and a touch electrode having a touch sensitive area;
arranging, on the electrically conductive layer, a light emitting diode with which the touch sensitive area is indicated, the light emitting diode having a light emitting surface facing at least partially the touch sensitive area, the light emitting diode having a first terminal being a first electrode zone electrically connected to the ground electrode and a second terminal being a second electrode zone electrically connected to the touch sensitive area.

19. The touch control glazing according to claim 6, wherein the heating zone is a part of the electrically conductive layer.

20. The touch control glazing according to claim 10, configured to form a vehicle windshield or roof or side window, or a door or window for a building.

21. The touch control glazing according to claim 11, wherein the electrically conductive layer is transparent and extends over the surface of the first transparent glazing.

22. The touch control glazing according to claim 1, wherein the first transparent glazing is made of mineral glass.

23. The touch control glazing according to claim 1, a portion of the first electrical zone extends into the touch sensitive area.

* * * * *